United States Patent
Israelski et al.

(10) Patent No.: US 7,257,198 B2
(45) Date of Patent: *Aug. 14, 2007

(54) METHOD, SYSTEM, AND ARTICLE FOR INFORMING A TELECOMMUNICATION CUSTOMER OF A FUTURE PERFORMANCE ESTIMATE FOR A TELECOMMUNICATION FEATURE

(75) Inventors: Edmond W. Israelski, Lake Barrington, IL (US); Robert Wesley Bossemeyer, Jr., St. Charles, IL (US); Jordan Howard Light, Chicago, IL (US); Denise Violetta Kagan, Riverwood, IL (US); Jose M. Cruz, Naperville, IL (US); Bruce Edward Stuckman, Algonquin, IL (US); Raymond Walden Bennett, III, Naperville, IL (US); Michael Steven Pickard, Highland Park, IL (US); Barry James Sullivan, Long Grove, IL (US); Richard Peter Krupka, Barrington, IL (US); Philip Martin Stebbings, Aurora, IL (US)

(73) Assignee: SBC Properties, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/701,368

(22) Filed: Nov. 4, 2003

(65) Prior Publication Data
US 2006/0210063 A1 Sep. 21, 2006

Related U.S. Application Data

(63) Continuation of application No. 09/407,128, filed on Sep. 27, 1999, now Pat. No. 6,674,839.

(51) Int. Cl.
*H04M 3/08* (2006.01)
(52) U.S. Cl. .................... 379/9.03; 379/14
(58) Field of Classification Search ............ 379/9.03, 379/14
See application file for complete search history.

(56) References Cited

U.S. PATENT DOCUMENTS

| | | | |
|---|---|---|---|
| 5,042,064 A | 8/1991 | Chung et al. | |
| 5,335,268 A | 8/1994 | Kelly, Jr. et al. | |
| 5,488,655 A | 1/1996 | Hamlen | |
| 5,884,037 A | 3/1999 | Aras et al. | |
| 5,887,156 A | 3/1999 | Subramanian et al. | |
| 5,930,333 A * | 7/1999 | Jabbarnezhad | 379/14 |
| 6,067,030 A | 5/2000 | Burnett et al. | |
| 6,169,724 B1 * | 1/2001 | Begum et al. | 370/216 |
| 6,272,110 B1 | 8/2001 | Tunnicliffe et al. | |

OTHER PUBLICATIONS

Harry Newton, 1998, Newton's Telecom Dictionary, p. 122.

* cited by examiner

*Primary Examiner*—Barry Taylor
(74) *Attorney, Agent, or Firm*—Brinks Hofer Gilson & Lione

(57) ABSTRACT

A performance of a telecommunication feature for a telecommunication customer is monitored. Based on the monitored performance, if an estimate of future performance of the telecommunication feature for the telecommunication customer is determined to be unfavorable, the telecommunication customer is informed of same.

24 Claims, 2 Drawing Sheets

METHOD, SYSTEM, AND ARTICLE FOR INFORMING A TELECOMMUNICATION CUSTOMER OF A FUTURE PERFORMANCE ESTIMATE FOR A TELECOMMUNICATION FEATURE

This application is a continuation of application Ser No. 09/407,128, filed Sep. 27, 1999, now U.S. Pat No. 6,674,839, which is hereby incorporated by reference herein.

TECHNICAL FIELD

The present invention relates to methods, systems, and articles for monitoring performance of telecommunication features.

BACKGROUND OF THE INVENTION

Telecommunication networks provide various telecommunication features to its customers or subscribers. Some features, such as multiple access lines and voice messaging systems, may begin to exhibit unfavorable performance as a customer's telecommunication activity grows significantly.

For example, the maximum number of simultaneous calls receivable at a business location is dependent upon the number of access lines between the business location and a telephone central office. As the telecommunication activity of the business grows, some incoming calls may be abandoned as a result of having an insufficient number of access lines.

As another example, the maximum content of voice messages stored by a voice messaging system is dependent upon the storage capacity of the voice messaging system. In this case, some voice messages may be lost due to an insufficient storage capacity of the voice messaging system.

Systems exist that examine trunk usage for a customer, and give the customer an idea of where traffic has exceeded capacity. Other systems examine either voice messaging customer premises equipment (CPE) or central-office-based voice messaging equipment utilization and suggest where more message storage capacity is needed.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF PREFERRED EMBODIMENTS

Embodiments of the present invention provide a proactive approach to determining that a future performance of a telecommunication feature for a telecommunication customer may be unfavorable. Preferably, the potentially-unfavorable future performance is determined before the telecommunication feature has performed unfavorably for the telecommunication customer.

The telecommunication customer is informed of the potentially-unfavorable future performance, and is given an opportunity either to upgrade an aspect of the telecommunication feature or to switch to an alternative telecommunication feature. Beneficially, the telecommunication feature may be upgraded or switched before an unfavorable performance occurs for the telecommunication customer.

Figure 1:
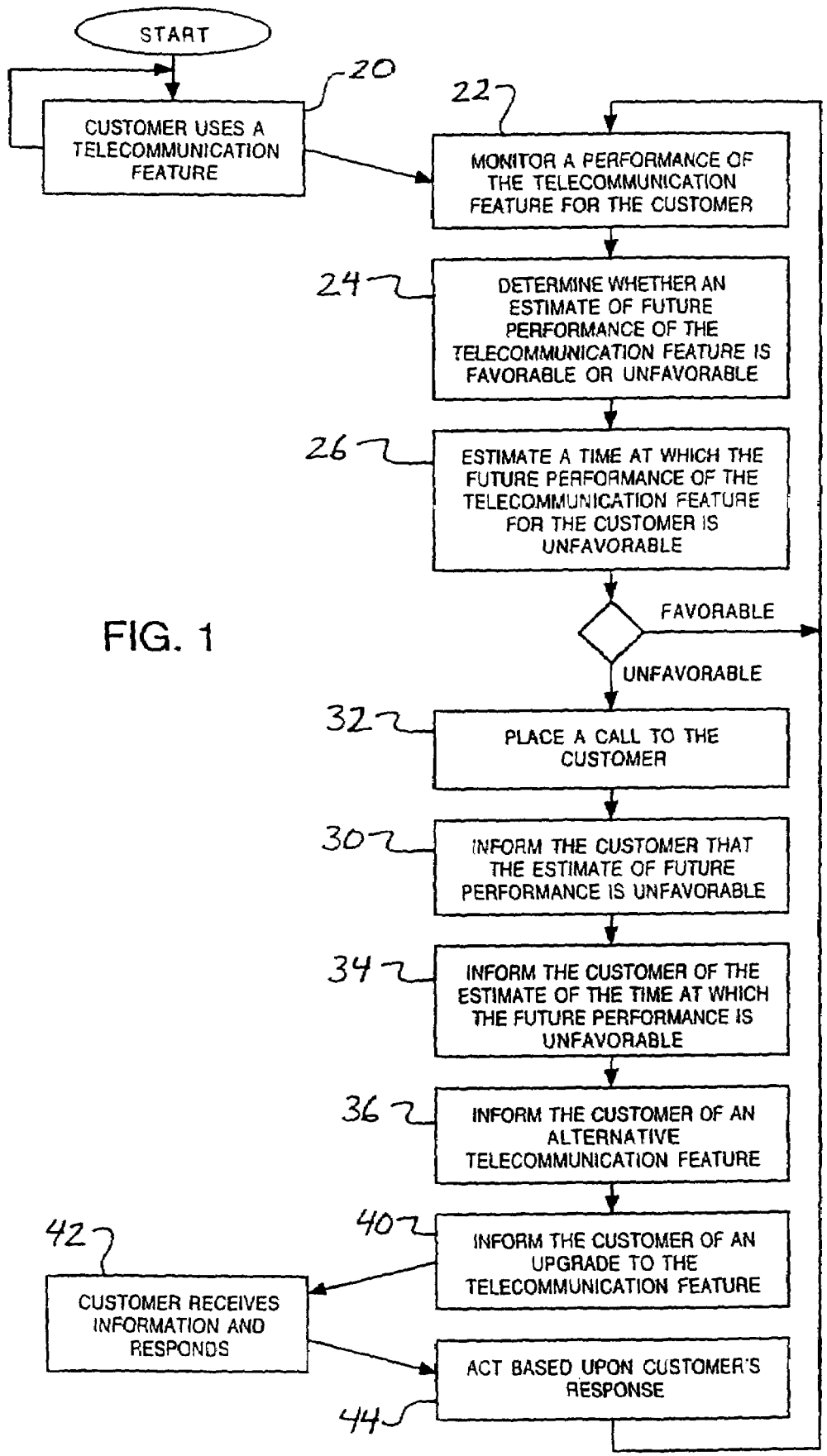
FIG. 1 is a flow chart of an embodiment of a method in accordance with the present invention.
Figure 2:
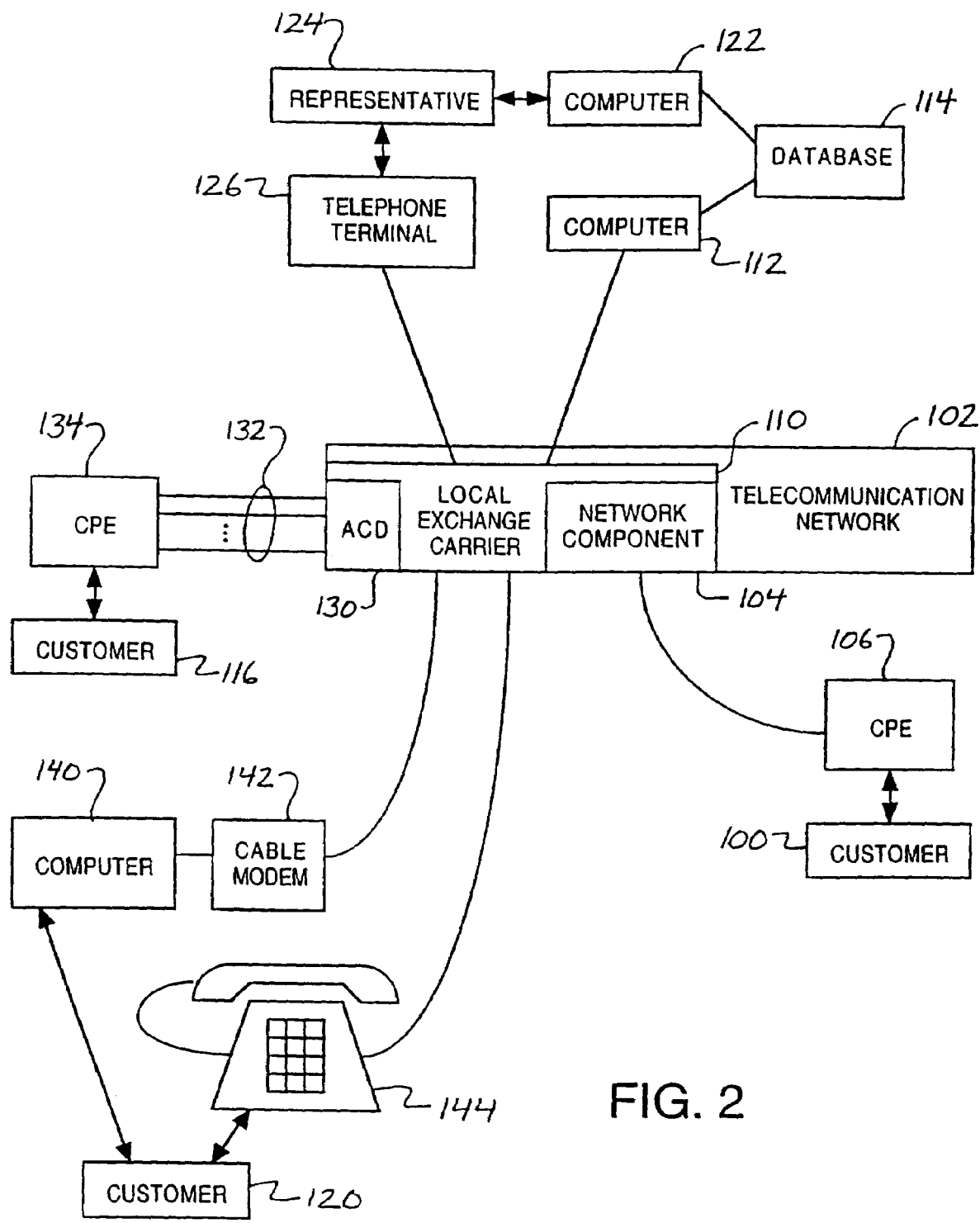
FIG. 2 is a schematic/block diagram of an embodiment of a system for performing the method.

A description of embodiments of the present invention is made with reference to FIG. 1, which shows a flow chart of an embodiment of a method in accordance with the present invention, and FIG. 2 which shows a schematic/block diagram of an embodiment of a system for performing the method. Based upon the herein-disclosed high-level description, one or more computer programs to direct one or more computers to perform the method is within the skill of a routineer in the art of telecommunications.

As indicated by block 20, a customer 100 repeatedly uses a telecommunication feature of a telecommunication network 102. Examples of the customer 100 include, but are not limited to, an individual, a residence and a business.

Examples of the telecommunication feature include, but are not limited to, a telecommunication service, a telecommunication product, and a combination thereof. The telecommunication feature may include either a voice communication feature, a data communication feature, an image communication feature, a video communication feature, or a combination thereof.

The telecommunication feature may comprise or be provided by either a telecommunication network component 104, customer premises equipment (CPE) 106, or a combination thereof. The telecommunication network component 104 is disposed within the telecommunication network 102. The telecommunication network component 104 may include transmission equipment, telecommunication servers, or a combination thereof. The CPE 106 is disposed at a location of the customer 100. Various types of CPE are well-known in the art of telecommunications.

The telecommunication network 102 may include a local exchange carrier (LEC) 110 which assists in providing the telecommunication feature to the customer 100. The LEC 110 has access to detailed data on individual customer feature and system usage, traffic patterns and congestion.

The LEC 110 may be capable of providing multiple network access to the customer 100. Examples of networks accessible via the LEC 110 include, but are not limited to, any combination of a circuit switched network, an internet protocol network, a cable television network, an digital data network, and a wireless telephone network. Of particular interest is the telecommunication network 102 comprising a telephone network, such as a public switched telephone network, and the LEC 110 comprising a central office which serves the customer 100.

As indicated by block 22, an act of monitoring a performance of the telecommunication feature for the customer 100 is performed. Examples of the performance include, but are not limited to, a measure of usage of the feature, a delay associated with using the feature, congestion associated with using the feature, and impairments associated with using the feature. Generally, the performance of the telecommunication feature may be measured either qualitatively or quantitatively. For example, a quantitative measure of usage may include a utilization percentage (e.g. 50%), while a qualitative measure of usage may include a characterization of utilization (e.g. very active, active, or inactive).

The act of monitoring may comprise collecting and storing a time sequence of performance values of the telecommunication feature for the customer 100. The time sequence of performance values is collected by a computer 112 and stored in a database 114. The database 114 comprises a computer-readable medium whose contents encode a data structure having the performance values for the customer 100. In addition, the contents of the computer-readable medium may encode data structures for other customers, such as customers 116 and 120, having telecommunication features which are monitored and processed in accordance with this disclosure.

As indicated by block 24, an act of determining whether an estimate of future performance of the telecommunication feature for the customer 100 is favorable or unfavorable is performed. The act of determining is performed by processing the monitored performance of the telecommunication feature for the customer 100. The act of determining may be performed by either the computer 112 or another computer 122 having access to the database 114.

Future performance of the telecommunication feature may be estimated using various well-known forecasting methods. Examples of forecasting methods include linear regression, polynomial regression, logarithmic regression, exponential regression, and time series analysis. One or more parameters of a regression equation may be determined based on the time sequence of performance values.

Future performance may also be estimated based upon one or more patterns in the performance values. For example, the performance values may have traffic-dependent patterns based on time-of-day and day-of-week.

The future performance may be estimated for a predetermined time or range of times in the future. For example, the future performance may be estimated for a predetermined number of months in the future (e.g. 3 months or 6 months in the future).

The estimate of future performance is compared to a threshold value. Based on the comparison, the future performance is determined to be either favorable or unfavorable. For example, if the estimate is beyond the threshold value, the future performance is determined to be unfavorable. For the purpose of this patent application, term "beyond" may mean either "greater than", "greater than or equal to", "less than", or "less than or equal to" depending on the type of performance being monitored.

Either as an alternative or in addition to estimating the future performance, an estimate of a time at which the future performance of the telecommunication feature for the customer 100 is unfavorable may be determined (block 26). The time may be estimated using various well-known forecasting methods and a predetermined performance value at which the performance is deemed unfavorable. Any of the aforementioned regression equations may be solved, either symbolically or numerically, to determine the time at which the performance is equal to the unfavorable performance value.

The estimate of the time at which the future performance is unfavorable may be compared to a threshold value. Based on the comparison, the future performance is determined to be either favorable or unfavorable. For example, if the estimate of time is less than or equal to the threshold value, the future performance is determined to be unfavorable. If the estimate of time is greater than the threshold value, the future performance may be determined to be favorable.

If the estimate of future performance is determined to be favorable, the aforementioned acts of monitoring the performance (block 22) of the customer 100 using the telecommunication feature (block 20) and determining whether the estimate of future performance is favorable or unfavorable (block 24) are repeated.

If the estimate of future performance is determined to be unfavorable, an act of informing the customer 100 of same is performed (block 30). Optionally, this act is preceded by an act of placing a telephone call to the customer 100 (block 32). In this case, the customer 100 is informed within the telephone call that the future performance of the telecommunication feature is unfavorable. A representative 124 such as a service representative, a marketing representative or a sales representative, using a telephone terminal 126 may communicate information to the customer 100 within the telephone call.

Optionally, as indicated by block 34, the customer 100 is further informed of an estimate of the time at which the future performance of the telecommunication feature for the customer 100 is unfavorable. For example, the customer 100 may be informed that the future performance of the telecommunication feature is forecasted to be unfavorable 3 months from now.

Optionally, a solution is proposed to the customer 100. For example, as indicated by blocks 36 and 40, the customer 100 may be informed of an alternative telecommunication feature having an estimate of future performance which is favorable for the customer 100, and/or of an upgrade to the telecommunication feature which results in an estimate of future performance which is favorable. Examples of upgrades to a telecommunication feature include, but are not limited to, upgrading a processor speed of a telecommunication server, upgrading an amount of memory in a telecommunication server, upgrading a storage capacity in a telecommunication server, upgrading a size of bandwidth access, and upgrading a number of access lines.

As indicated by block 42, the customer 100 receives the information, and is given an opportunity to upgrade an aspect of the telecommunication feature, and/or to purchase or subscribe to an alternative telecommunication feature. Based on a response by the customer 100, either the representative 124 or another representative may initiate acts to upgrade the telecommunication feature and/or to purchase or subscribe to an alternative telecommunication feature (block 44).

Preferably, a computer such as the computer 112 or the computer 122 outputs at least one signal to initiate the herein-described acts of informing the customer 100. The computer may output signals to display a name of the customer 100, a telephone number of the customer 100, the telecommunication feature, an estimated time at which the future performance of the telecommunication feature for the customer 100 is unfavorable, recommended upgrade(s) to the telecommunication feature, and recommended alternative telecommunication feature(s), for view by the representative 124. The representative 124 uses the displayed information when communicating with the customer 100.

Alternatively, the computer may output a signal to inform the customer 100 via a computer network, such as an internet, and intranet, or an extranet. The computer may output signals to display a name of the customer 100, a telephone number of the customer 100, the telecommunication feature, an estimated time at which the future performance of the telecommunication feature for the customer 100 is unfavorable, recommended upgrade(s) to the telecommunication feature, and recommended alternative telecommunication feature(s), for view by the customer 100. For example, the computer may either create a customer-accessible Web page having the aforementioned information, or send an electronic mail message having the aforementioned information to the customer 100.

Preferably, the acts of determining that the estimate of future performance is unfavorable and informing the customer 100 are performed when the monitored performance is favorable. Beneficially, the customer 100 may choose to upgrade the feature and/or switch to an alternative feature before the monitored performance becomes unfavorable.

It is noted that as an alternative to placing the telephone call, the act of informing the customer 100 may be performed by sending an electronic message to the customer 100, printing and sending a letter to the customer 100, a sending a fax message to the customer 100, pushing a Web page to the customer 100, or creating a Web page that is accessible only by the customer 100. It is noted that a Web page may be accessed by a customer 100 via a computer network such as an internet, an intranet, or an extranet.

To illustrate an embodiment of the present invention, consider the customer 116 being a business, and the telecommunication feature comprising an automatic call distributor (ACD) 130 at a central office of a telephone network. The business has a plurality of telephone access lines 132 to receive telephone calls distributed by the ACD 130. The business further has customer premises equipment 134 in communication with the telephone access lines 132.

The ACD 130 produces performance information including a number of abandoned incoming calls. The performance of the ACD 130 is deemed to be unfavorable if the number of abandoned incoming calls over a time period is greater than or equal to a predetermined threshold.

The computer 112 stores data representative of a time sequence of abandoned calls in the database 114. Either the computer 112 or the computer 122 processes the data, and determines that although the performance of the ACD 130 is favorable at the present time, usage of the ACD 130 is growing at a rate such that the performance may be unfavorable in 6 months.

A sales representative places a telephone call to the business. In the telephone call, the sales representative informs the business that the number of abandoned incoming calls to the ACD 130 may be unfavorable in 6 months, and that by increasing the number of access lines to a specific number, the estimated future performance is favorable over the next 12 months. During either this telephone call or a subsequent telephone call, the business may elect to upgrade the number of access lines to the ACD 130.

To illustrate another embodiment of the present invention, consider the customer 120 being residential, and the telecommunication feature comprising a computer network service provided using a cable television infrastructure. The residence has a computer 140 with a cable modem 142 coupled to the cable television infrastructure to use the computer network service.

The computer 112 monitors and stores performance data, including a time sequence of bandwidth provided to the customer 100, in the database 114. Since the customer 100 must share bandwidth with neighboring users of the cable-television-based computer network service, the customer's bandwidth performance is variable.

Either the computer 112 or the computer 122 processes the data, and determines that although the bandwidth performance provided to the customer 100 is favorable at the present time, usage by neighboring users is growing at a rate such that the performance may be unfavorable in 3 months.

A sales representative places a telephone call to a telephone 144 at the residence. In the telephone call, the sales representative informs an individual that the bandwidth performance may be unfavorable in 3 months, and that a favorable, dedicated bandwidth is available by subscribing to an asymmetric digital subscriber line (ADSL) service rather than the cable-television-based service. During either this telephone call or a subsequent telephone call, the individual may elect to cancel the cable-television-based service and subscribe to the ADSL service.

Embodiments of the herein-disclosed methods may be directed by computer-readable instructions encoded on a computer-readable medium. The contents of the computer-readable medium cause at least one computer to perform the herein-disclosed acts. For this purpose, at least one computer processor is responsive to the contents of the computer-readable medium.

Examples of the computer-readable medium include, but are not limited to, a computer-readable storage medium and a computer-readable communication medium. Examples of a computer-readable storage medium include, but are not limited to, an optical storage medium, an electronic storage medium, and a magnetic storage medium. The computer-readable storage medium may include stored data which encode computer program code and/or other computer-readable instructions.

The computer-readable storage medium may include stored data which encode the herein-disclosed customer information. Examples of the aforementioned stored data include, but are not limited to, a name of the customer 100, a telephone number of the customer 100, the telecommunication feature, an estimated time at which the future performance of the telecommunication feature for the customer 100 is unfavorable, recommended upgrade(s) to the telecommunication feature, and recommended alternative telecommunication feature(s). The aforementioned stored data may be stored by a database, such as a Web-accessible database.

Examples of a computer-readable communication medium include, but are not limited to, an optical communication medium, an electronic communication medium, and an electromagnetic communication medium. The contents of the computer-readable communication medium may include one or more waveforms which encode computer data such as computer program code and/or other computer-readable instructions, and/or customer information.

Thus, there has been described herein several embodiments including preferred embodiments of a method, system and medium for informing a telecommunication customer of a future performance estimate of a telecommunication feature.

It will be apparent to those skilled in the art that the disclosed invention may be modified in numerous ways and may assume many embodiments other than the preferred form specifically set out and described above. For example, more than one computer may access the database 114 to store and/or to process performance data. Further, some acts described herein may be automated rather than performed by a representative.

Accordingly, it is intended by the appended claims to cover all modifications of the invention which fall within the true spirit and scope of the invention.

What is claimed is:

1. A method comprising:
   monitoring a performance of a telecommunication feature for a telecommunication customer;
   determining an estimate of a time at which future performance of the telecommunication feature for the telecommunication customer will become unfavorable;
   informing the telecommunication customer of the estimate of the time at which the future performance of the telecommunication feature for the telecommunication customer will become unfavorable; and
   informing the telecommunication customer of at least one of:

an alternative telecommunication feature having an estimate of future performance for the telecommunication customer which is favorable; and an upgrade to the telecommunication feature, the upgrade having an estimate of future performance for the telecommunication customer which is favorable.

2. The method of claim 1 wherein monitoring a performance of a telecommunication feature for a telecommunication customer comprises:

collecting and storing a time sequence of performance values of the telecommunication feature for the telecommunication customer.

3. The method of claim 1, wherein determining an estimate of a time at which future performance of the telecommunication customer will be come unfavorable comprises:

determining an estimate of future performance of the telecommunication feature for the telecommunication customer;

determining that the estimate of future performance of the telecommunication feature for the telecommunication customer is unfavorable;

determining an estimate of a time at which future performance of the telecommunication feature for the telecommunication customer will first become unfavorable.

4. The method of claim 3, wherein determining that the estimate of future performance of the telecommunication feature for the telecommunication customer is unfavorable comprises:

comparing the estimate of future performance of the telecommunication feature for the telecommunication customer to a threshold value.

5. The method of claim 3, wherein the estimate of future performance is for a predetermined range of future times.

6. The method of claim 1, wherein the steps of determining an estimate of a time at which future performance of the telecommunication feature for the telecommunication customer will become unfavorable and informing the telecommunication customer of the estimate of the time at which the future performance of the telecommunication feature for the telecommunication feature for the telecommunication customer will become unfavorable are performed when the performance of the telecommunication feature for the telecommunication customer is favorable.

7. The method of claim 1, wherein the telecommunication feature comprises customer premise equipment.

8. The method of claim 1, wherein the telecommunication feature comprises a telecommunications network component.

9. The method of claim 1, further comprising informing the telecommunication customer of a solution for remedying the estimated unfavorable future performance of the telecommunication feature.

10. The method of claim 1 further comprising placing a telephone call to the telecommunication customer, wherein said informing is performed within the telephone call.

11. An apparatus comprising:
at least one computer to:
monitor a performance of a telecommunication feature for a telecommunication customer,
determine an estimate of a time at which future performance of the telecommunication feature for the telecommunication customer will become unfavorable,
output a signal to initiate informing the telecommunication customer of the estimate of the time at which the future performance of the telecommunication feature for the telecommunication customer will become unfavorable, and
output a signal to initiate informing the telecommunication customer of at least one of:
an alternative telecommunication feature having an estimate of future performance for the telecommunication customer which is favorable, and
an upgrade to the telecommunication feature, the upgrade having an estimate of future performance for the telecommunication customer which is favorable.

12. The apparatus of claim 11, wherein the at least one computer is to monitor the performance by collecting and storing a time sequence of performance values of the telecommunication feature for the telecommunication customer.

13. The apparatus of claim 11, wherein the at least one computer is to display the estimate of the time at which the future performance of the telecommunication feature for the telecommunication customer will become unfavorable.

14. The apparatus of claim 11, wherein the telecommunication feature comprises customer premise equipment.

15. The apparatus of claim 11, wherein the telecommunication feature comprises a telecommunication network component.

16. The apparatus of claim 11, wherein the at least one computer is operative to output a signal to initiate informing the telecommunication customer of a solution for remedying the estimated unfavorable future performance of the telecommunication feature.

17. The apparatus of claim 11, wherein the at least one computer is operative to output a signal to initiate placing a telephone call to the telecommunication customer, wherein said informing is performed within the telephone call.

18. A computer-readable storage medium comprising a set of instructions, the set of instructions to direct at least one computer to:
monitor a performance of a telecommunication feature for a telecommunication customer,
determine an estimate of a time at which future performance of the telecommunication feature for the telecommunication customer will become unfavorable,
output a signal to initiate informing the telecommunication customer of the estimate of the time at which the future performance of the telecommunication feature for the telecommunication customer will become unfavorable, and
output a signal to initiate informing the telecommunication customer of at least one of:
an alternative telecommunication feature having an estimate of future performance for the telecommunication customer which is favorable, and
an upgrade to the telecommunication feature, the upgrade having an estimate of future performance for the telecommunication customer which is favorable.

19. The computer-readable storage medium of claim 18, wherein the performance is monitored by collecting and storing a time sequence of performance values of the telecommunication feature for the telecommunication customer.

20. The computer-readable storage medium of claim 18, further comprising a set of instructions to direct at least one computer to display the estimate of the time at which the future performance of the telecommunication feature for the telecommunication customer will become unfavorable.

21. The computer-readable storage medium of claim 18, wherein the telecommunication feature comprises customer premise equipment.

22. The computer-readable storage medium of claim 18, wherein the telecommunication feature comprises a telecommunication network component.

23. The computer-readable storage medium of claim 18, wherein the set of instructions direct at least one computer to output a signal to initiate informing the telecommunication customer of a solution for remedying the estimated unfavorable future performance of the telecommunication feature.

24. The computer-readable storage medium of claim 18, wherein the set of instructions direct at least one computer to output a signal to initiate placing a telephone call to the telecommunication customer, wherein said informing is performed within the telephone call.

* * * * *